R. H. VONDENBOSCH.
FURNACE.
APPLICATION FILED APR. 22, 1908.
945,994. Patented Jan. 11, 1910.
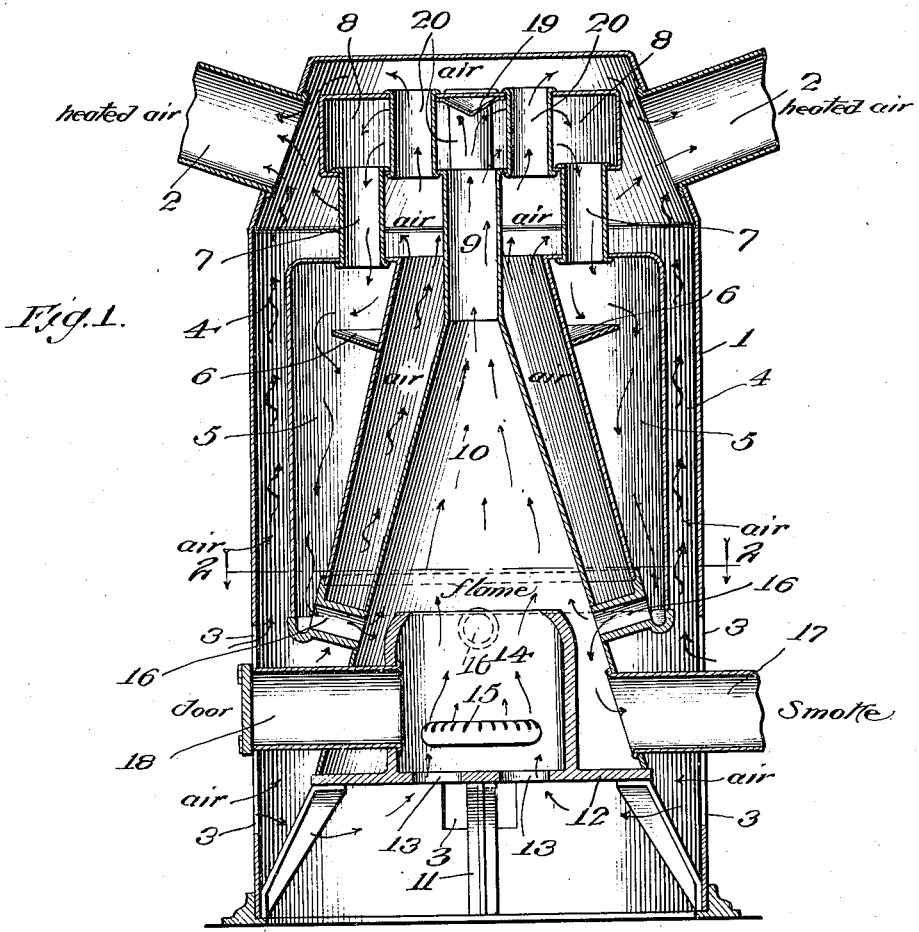
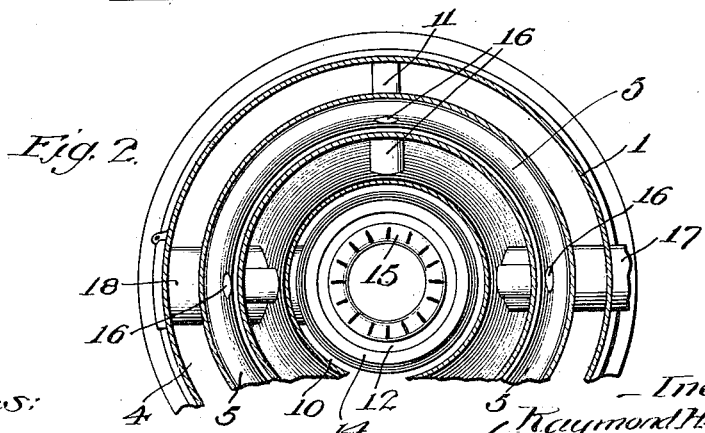

UNITED STATES PATENT OFFICE.

RAYMOND H. VONDENBOSCH, OF HOLLYWOOD, CALIFORNIA, ASSIGNOR OF ONE-HALF TO GODFREY FRITZ, OF LOS ANGELES, CALIFORNIA.

FURNACE.

945,994.   Specification of Letters Patent.   Patented Jan. 11, 1910.

Application filed April 22, 1908. Serial No. 428,656.

*To all whom it may concern:*

Be it known that I, RAYMOND H. VONDENBOSCH, a citizen of the United States, residing at Hollywood, in the county of Los Angeles and State of California, have invented new and useful Improvements in Furnaces, of which the following is a specification.

This invention relates to a heating furnace for buildings and consists in such novel arrangements of the air and flame passage ways that the heat of the flame is utilized to its maximum efficiency.

One of the novel features upon which the efficiency of this furnace depends is the repassing of the heated gases of combustion into the bottom of the flue in which the combustion chamber is situated before being carried out through the exhaust flue to the atmosphere. By this means the uncombined air in the heated gases is given an opportunity to pass again through the furnace, increasing greatly the efficiency of the flame and of the furnace in general.

Other novel points of construction will appear in the following description.

I accomplish the above by means of the device described herein and illustrated in the accompanying drawings, in which:—

Figure 1,—is a longitudinal vertical section of a furnace embodying my invention. Fig. 2,—is a horizontal cross-section taken on line 2—2 of Fig. 1.

In the drawings 1 designates an outer cylindrical shell resting upon the floor and provided at its top with air outlets 2 through which the heated air is conducted to the rooms of a building in the usual manner. Near its bottom shell 1 is provided with air inlet openings 3 of any suitable size and number. Within the shell, and of such a diameter as to leave an annular air space 4, is an annular chamber 5 whose outer walls are cylindrical and whose inner walls are conical in configuration so that the chamber is wide in section at the top and narrow at the bottom. This chamber is provided with a baffle plate 6 to partially impede the passage of the heated gases therethrough, so as to prevent their passing too swiftly from the furnace without giving up a large proportion of their heat. Chamber 5 is connected by tubes 7 to a flat drum 8 situated inside of shell 1 near its top. This drum is in turn connected by a centrally located tube 9 to an inverted cone-shaped flue 10 located centrally within the conical opening inside of annular chamber 5. The walls of this conical combustion space are supported on legs 11 from the bottom of the furnace and base plate 12 thereof is provided with air inlet openings 13. Resting upon base plate 12 is a cylindrical shield 14 forming a combustion chamber in which burner 15 is placed. Tubes 16 open from the bottom narrow part of chamber 5 into flue 10 directly below the top of shield 14, the shield being slightly contracted and of such a diameter that an open space is left between its top and the walls of the flue. An exhaust funnel 17 is connected to the bottom of the flue and leads off whatever products of combustion pass into the space around shield 14 from tubes 16. A door 18 affords means for lighting the fire at burner 15 and for any investigation necessary.

In the operation of this furnace the flame and heated gases of combustion pass upwardly through flue 10 and tube 9 into drum 8. Here they strike a conical deflector 19 which spreads them radially toward the outside of the drum where they pass downwardly through tubes 7 into annular chamber 5. Here they encounter baffle plate 6 and then pass to the bottom of chamber 5 and through tubes 16 into the space directly surrounding shield 14. The heavier part of the gases, those parts which are products of combustion and are "dead," pass downwardly as indicated by the arrows, into the space around shield 14 and out through funnel 17. The lighter parts, the uncombined air, pass upwardly into the combustion space, and, being warm, materially help in the ventilation of the flame and also are given another opportunity to impart their heat to the air flowing through the adjacent passage ways. The air enters at the openings 3 and passes up largely between the outer walls of flue 10 and the inner walls of chamber 5. Upon reaching the top the air passes around drum 8 and thence divides to pass out through tubes 2 of which there may be any desired number. The air also passes directly up through shell 1 on the outside of chamber 5 to the tubes 2 so that chamber 5 and flue 10, together with drum 8 are completely surrounded by air which is desired to be heated. Tubes 20 are also provided leading vertically through drum 8 so that the air may come into contact with as large a heating space as possible around the drum.

This furnace may be made in any suitable size to supply heat to any number of separate rooms, the number of heating ducts and the size thereof being arranged accordingly.

This furnace is especially designed for gas and can therefore be made of light sheet material. In actual practice it heats up quickly with a minimum amount of fuel and maintains its heat with a very small flame after having been started.

Having described my invention, what I claim as new and desire to secure by Letters Patent is:—

1. A furnace, comprising an inner flue, a chamber spaced around said flue, means establishing communication between said chamber and the top and bottom of said flue, induction means for a flame at the center of the bottom of said flue, and exhaust means at the bottom of said flue.

2. A furnace, comprising an inner flue, a combustion chamber centrally placed in the bottom of said flue, a chamber arranged around said flue, means establishing communication between said chamber and the top and bottom of said flue, and an exhaust flue connected to the bottom of said inner flue below the top of said chamber therein.

3. A furnace, comprising an upright conical flue, a combustion chamber centrally placed in the bottom of said flue, a downwardly leading chamber concentrically arranged around said flue, the inner wall of said chamber being conical, means establishing communication between said chamber and the top and bottom of said flue, and an exhaust flue connected to said conical flue at a point below the top of said combustion chamber.

4. A furnace, comprising an upright conical flue, a combustion chamber centrally placed in the bottom of said flue, a downwardly leading chamber concentrically arranged around said flue, the inner wall of said second named chamber being conical, a drum above said flue, means establishing communication between the downwardly leading chamber and the bottom of said flue, means establishing communication between said drum and the tops of said downwardly leading chamber and said flue respectively, and an exhaust flue connected to said conical flue at a point below the top of said combustion chamber.

5. A furnace, comprising an outer casing, a centrally disposed combustion flue arranged within said casing, a chamber spaced around said flue, means establishing communication between said chamber and the bottom of said flue, a drum disposed in the upper portion of said casing, and means establishing communication between said drum and the tops of said flue and chamber.

6. The combination with a gas furnace having a combustion chamber and a combustion flue, of a heating drum arranged within said furnace, means establishing communication between the interior of said drum and the top and bottom of said combustion flue, and an exhaust flue connected to said combustion flue below the top of said combustion chamber.

7. A furnace, comprising an outer casing, a centrally disposed combustion flue arranged within said casing, a heating drum provided with a plurality of vertical flues opening therethrough, and means establishing communication between said drum and the top and bottom of said combustion flue.

8. A furnace, comprising an outer casing, a centrally disposed combustion flue arranged within said casing, a drum, and means establishing communication between said drum and the top and bottom of said flue.

9. A furnace, comprising a casing and a combustion flue disposed therein, a drum, and means establishing communication between the top and bottom of said flue and said drum.

In witness that I claim the foregoing I have hereto subscribed my name this 13th day of April, 1908.

RAYMOND H. VONDENBOSCH.

Witnesses:
EDMUND A. STRAUSE,
OLLIE PALMER.